US012165609B2

(12) United States Patent
Cao et al.

(10) Patent No.: US 12,165,609 B2
(45) Date of Patent: Dec. 10, 2024

(54) DISPLAY PANEL

(71) Applicant: Wuhan China Star Optoelectronics Technology Co., Ltd., Wuhan (CN)

(72) Inventors: Haiming Cao, Wuhan (CN); Chao Tian, Wuhan (CN); Yanqing Guan, Wuhan (CN); Fei Ai, Wuhan (CN); Guanghui Liu, Wuhan (CN); Zhifu Li, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/613,579

(22) PCT Filed: Sep. 6, 2021

(86) PCT No.: PCT/CN2021/116718
§ 371 (c)(1),
(2) Date: Nov. 23, 2021

(87) PCT Pub. No.: WO2023/004934
PCT Pub. Date: Feb. 2, 2023

(65) Prior Publication Data

US 2024/0257781 A1 Aug. 1, 2024

(30) Foreign Application Priority Data

Jul. 26, 2021 (CN) ........................ 202110842941.X

(51) Int. Cl.
*G09G 3/36* (2006.01)

(52) U.S. Cl.
CPC ... *G09G 3/3677* (2013.01); *G09G 2300/0852* (2013.01); *G09G 2310/0297* (2013.01); *G09G 2310/08* (2013.01); *G09G 2380/02* (2013.01)

(58) Field of Classification Search
CPC ......... G09G 3/3677; G09G 2300/0852; G09G 2310/0297; G09G 2380/02
See application file for complete search history.

(56) References Cited

U.S. PATENT DOCUMENTS

| | | | | |
|---|---|---|---|---|
| 2015/0243237 A1* | 8/2015 | Li | ........................ | G11C 19/287 377/64 |
| 2018/0144711 A1 | 5/2018 | Noh et al. | | |
| 2019/0206504 A1* | 7/2019 | Tao | ...................... | G09G 3/3266 |
| 2021/0118375 A1 | 4/2021 | Yang et al. | | |

FOREIGN PATENT DOCUMENTS

| | | |
|---|---|---|
| CN | 105469761 A | 4/2016 |
| CN | 105575349 A | 5/2016 |
| CN | 105702223 A | 6/2016 |
| CN | 106097996 A | 11/2016 |
| CN | 107958649 A | 4/2018 |
| CN | 110379349 A | 10/2019 |
| CN | 112397008 A | 2/2021 |
| CN | 112419960 A | 2/2021 |

* cited by examiner

*Primary Examiner* — Benjamin C Lee
*Assistant Examiner* — Nathan P Brittingham
(74) *Attorney, Agent, or Firm* — Nathan & Associates; Menachem Nathan

(57) ABSTRACT

The present application provides a display panel in which transistors in an input pull-up module, a stage transfer output module, and an output pull-up module are provided as P-type low temperature polysilicon thin film transistors, and a transistor in an output pull-down module is provided as an N-type metal oxide thin film transistor.

20 Claims, 4 Drawing Sheets

DISPLAY PANEL

FIELD OF INVENTION

The present application relates to display technology fields, and in particular to a display panel.

BACKGROUND OF INVENTION

With the development of display technology, the requirements for displays are getting higher and higher. It is a technical problem to be solved on how to ensure that a display panel can perform high-frequency dynamic display while realizing a flexible display so as to further ensure the smoothness of the screen.

Therefore, it is necessary to propose a technical solution in order to enable the display panel to achieve flexible display while facilitating the display panel to achieve high frequency display.

SUMMARY OF INVENTION

Technical Problem

An object of the present application is to provide a display panel to enable the display panel to achieve flexible display while facilitating high-frequency display of the display panel.

Technical Solution

A display panel, wherein the display panel comprises N cascaded gate driving units, the N is a positive integer, and an n-th stage gate driving unit comprising:

a stage transfer output module connected to a first node, and configured to alternately output an n-th stage transfer signal with a high level and an n-th stage transfer signal with a low level in response to a voltage of the first node, wherein the n is an integer greater than or equal to 1 and less than or equal to the N;

an input pull-up module configured to controlling a potential of the first node;

an output pull-up module connected to an output terminal of the stage transfer output module and configured to output an n-th stage scan signal with a high level in response to the n-th stage transfer signal with the low level; and an output pull-down module connected to the output terminal of the stage transfer output module and configured to output an n-th stage scan signal with a low level in response to the n-th stage transfer signal with the high level, wherein the transistors in the stage transfer output module, the input pull-up module, and the output pull-up module are all P-type low temperature polysilicon thin film transistors, and a transistor in the output pull-down module is an N-type metal oxide thin film transistor.

A display panel, wherein the display panel comprises N cascaded gate driving units, the N is a positive integer, and an n-th stage gate driving unit comprising:

a first P-type low temperature polysilicon thin film transistor, wherein a gate of the first P-type low temperature polysilicon thin film transistor receives a first clock signal, a first electrode of the first P-type low temperature polysilicon thin film transistor receives a start signal or an (n−1)-th stage transfer signal output by an (n−1)-th stage gate driving unit, a second electrode of the first P-type low temperature polysilicon thin film transistor is connected to a first node, and n is an integer greater than or equal to 1 and less than or equal to N;

a second P-type low temperature polysilicon thin film transistor, wherein a gate of the second P-type low temperature polysilicon thin film transistor is connected to the first node, a first electrode of the second P-type low temperature polysilicon thin film transistor receives a second clock signal, and a second electrode of the second P-type low temperature polysilicon thin film transistor is connected to an output terminal of a n-th stage transfer signal;

a third P-type low temperature polysilicon thin film transistor, wherein a gate of the third P-type low temperature polysilicon thin film transistor is connected to the output terminal of the n-th stage transfer signal, a first electrode of the third P-type low temperature polysilicon thin film transistor receives a constant high level voltage, and a second electrode of the third P-type low temperature polysilicon thin film transistor is connected to an output terminal of the n-th stage gate driving unit; and a first N-type metal oxide thin film transistor, wherein a gate of the first N-type metal oxide thin film transistor is connected to the output terminal of the n-th stage transfer signal, a first electrode of the first N-type metal oxide thin film transistor receives a first constant low level voltage, and a second electrode of the first N-type metal oxide thin film transistor is connected to the output terminal of the n-th stage gate driving unit, wherein a pulse period of the second clock signal is the same as a pulse period of the first clock signal, and a phase of the second clock signal is opposite to a phase of the first clock signal.

Advantageous Effects

The present application provides a display panel, in which transistors in an input pull-up module, a stage transfer output module, and an output pull-up module are provided as P-type low temperature polysilicon thin film transistors, and a transistor in an output pull-down module is provided as an N-type metal oxide thin film transistor, so that a gate driving unit may be manufactured by a low temperature process, which meets a process requirement of a flexible display panel, and ensures that a scan signal output by the gate driving unit can be rapidly pulled up and pulled down, and further enables the gate driving unit to output a scan signal at a high frequency, which facilitates high-frequency display of the display panel. In addition, the use of P-type low temperature polysilicon thin film transistors in the gate driving unit is beneficial to save the number of photomasks used to prepare the gate driving unit.

DETAILED DESCRIPTION OF EMBODIMENTS

Technical solutions in embodiments of the present application will be clearly and completely described below in conjunction with drawings in the embodiments of the present application. Obviously, the described embodiments are only a part of embodiments of the present application, rather than all the embodiments. Based on the embodiments in the present application, all other embodiments obtained by those skilled in the art without creative work fall within the protection scope of the present application.

In view of the problems of the above-described background art, the inventors of the present application have found, based on rich practical experience and a large number of creative explorations, that N-type low temperature polysilicon thin film transistors are generally not suitable for use in a flexible display process due to a higher process temperature of the N-type low temperature polysilicon thin film transistor due to requirement for channel doping; however, P-type low temperature polysilicon thin film transistors may be prepared by using a low temperature process, when the P-type low temperature polysilicon thin film transistors are applied to the preparation of a gate driving circuit of a flexible display panel, the P-type low temperature polysilicon thin film transistors have a poor pull-down capability, resulting in a relatively long time corresponding to a falling edge during which a scan signal with a high level, which is outputted by the gate driving circuit composed of the P-type low temperature polysilicon thin film transistor, is pulled down to a scan signal with a low level, which makes it difficult for the gate driving circuit composed of the P-type low temperature polysilicon thin film transistor to support high-frequency display. Based on this, according to the present application, a transistor in the output pull-down module of the gate driving unit is an N-type metal oxide thin film transistor, a transistor in an output pull-up module is a P-type low temperature polysilicon transistor, and transistors in an input pull-up module and a stage transfer output module are all P-type low temperature polysilicon thin film transistors, so that the gate driving unit meets the low temperature processing requirements of the flexible display panel, and the gate driving unit has a fast pull-down capability and a fast pull-up capability, which facilitates the gate driving unit to output a scan signal at a high frequency and further ensures the display panel to display at high frequency.

Figure 1:
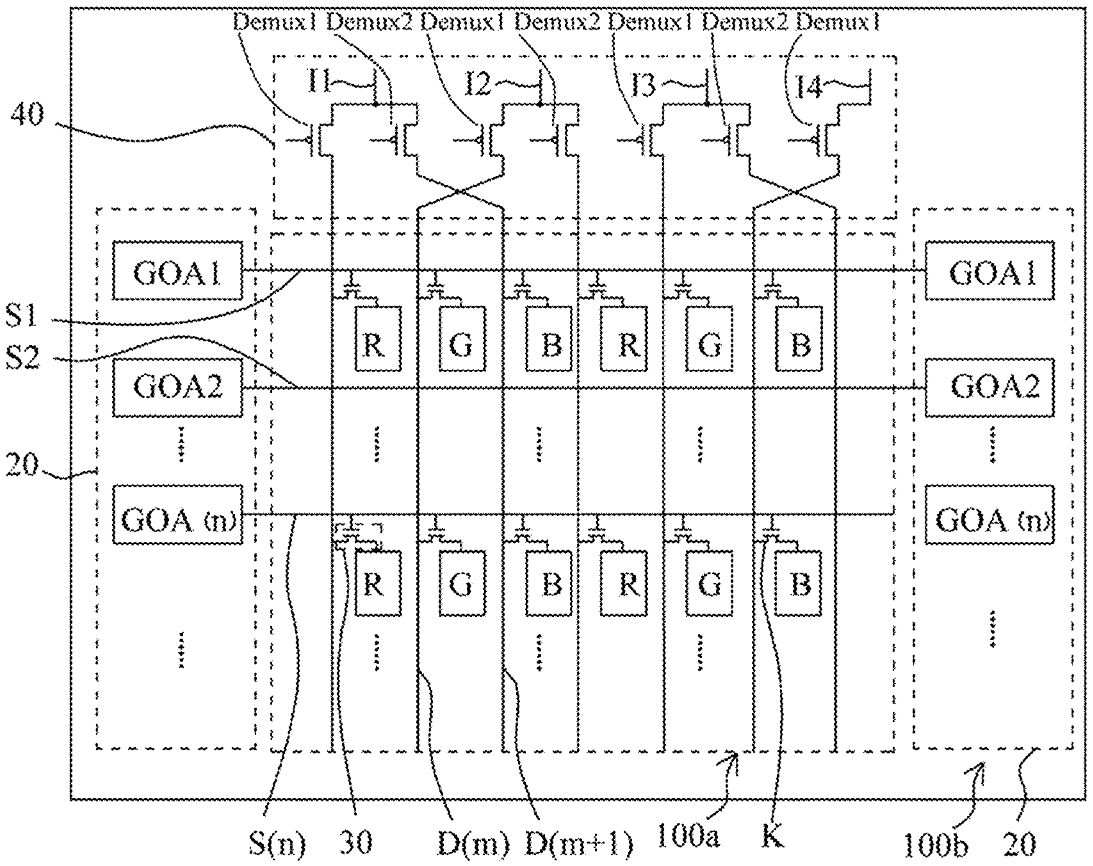
FIG. 1 is a schematic plan view of a display panel according to an embodiment of the present application.

As shown in FIG. 1, it is a schematic plan view of a display panel according to an embodiment of the present application. A display panel 100 is a liquid crystal display panel. The display panel 100 has a display area 100*a* and a peripheral area 100*b*. The display panel 100 includes a gate driving circuit 20, a pixel circuit 30 and a demultiplexing circuit 40, the pixel circuit 30 is disposed in the display area 100*a* of the display panel 100, and the gate driving circuit 20 and the demultiplexing circuit 40 are disposed in the peripheral area 100*b* of the display panel 100.

In the present embodiment, the display panel 100 includes a plurality of scan lines and a plurality of data lines. The plurality of scan lines include a scan line S1, a scan line S2 and a scan line S(n), and the plurality of data lines include first type data lines D(m) and second type data lines D(m+1). One of the first type data lines D(m) is adjacent to and alternately arranged with one of the second type data lines D(m+1), a polarity of a data signal transmitted by the first type data line D(m) is opposite to a polarity of a data signal transmitted by the second type data line D(m+1), and for example, the first type data line D(m) transmits a data signal having a positive polarity, and the second type data line D(m+1) transmits a data signal having a negative polarity. The plurality of scan lines and the plurality of data lines are arranged in the display area 100*a* of the display panel 100, the plurality of scan lines extend in a row direction and are arranged in a column direction, and the plurality of data lines are arranged in the column direction and extend in the row direction. Each pixel circuit 30 is connected to one scan line and one data line, and includes one switching transistor K, a gate of the switching transistor K is connected to the scan line, a first electrode of the switching transistor K is connected to the data line, and a second electrode of the switching transistor K is connected to a pixel electrode. The display panel 100 further includes red sub-pixels R, green sub-pixels G and blue sub-pixels B. The sub-pixels in a same column are the red sub-pixels R, the green sub-pixels G, or the blue sub-pixels B. One data line is connected to the sub-pixels in one column.

In the present embodiment, the switching transistor K is an N-type metal oxide thin film transistor to reduce a leakage current of the switching transistor K during a display process and meet a requirement of a long screen duration in the low-frequency or ultra-low-frequency display process.

Referring still to FIG. 1, the gate driving circuit 20 is located at opposite sides of the display area 100*a* of the display panel 100, and one scan line is connected to two opposite gate driving units GOA to realize bilateral driving of the scan line. It is understood that the gate driving circuit 20 may also be located only at one side of the display area 100*a* of the display panel 100, and one scan line is connected to one gate driving unit to implement one-side driving of the scan line; alternatively, the gate driving circuit 20 may be located at opposite sides of the display area 100*a* of the display panel 100, and an odd-number-row scan lines and an even-number-row scan lines are respectively connected to two gate driving units GOA located on opposite sides to realize one-side driving of the scan lines.

Figure 2:
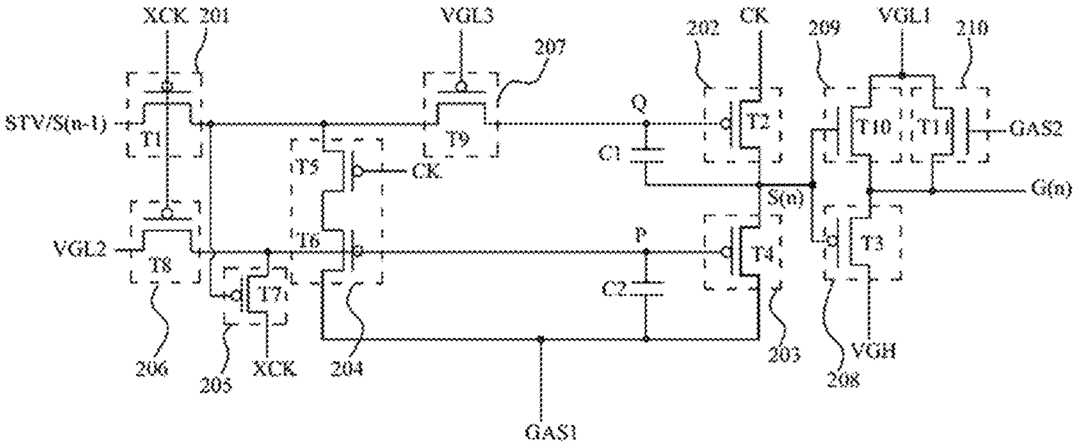
FIG. 2 is a circuit diagram of an n-th stage gate driving unit of a gate driving circuit shown in FIG. 1.

In order to describe the technical solution of the present application, the gate driving circuit 20 on each side of the display area 100*a* of the display panel 100 includes N cascaded gate driving units as an example. As shown in FIG. 2, FIG. 2 is a circuit diagram of an n-th stage gate driving unit in the gate driving circuit shown in FIG. 1. The n-th stage gate driving unit GOA(n) includes an input pull-up module 201, a stage transfer output module 202, a stage transfer maintaining module 203, a first node maintaining module 204, a first node feedback module 205, a second node pull-down module 206, a voltage clamping module 207, an output pull-up module 208, an output pull-down module 209, and a touch control maintaining module 210. The input pull-up module 201, the stage transfer output module 202, the voltage clamping module 207, the stage transfer maintaining module 203, the first node feedback module 205, the first node maintaining module 204, and the second node pull-down module 206 of the n-th stage gate driving unit GOA(n) constitute a logic control module for alternately outputting an n-th stage transfer signal S(n) having a high level and an n-th stage transfer signal S(n) having a low level. The output pull-up module 208, the output pull-down module 209, and the touch control maintaining module 210 constitute an output module to output an n-th stage scan signal having a high level or an n-th stage scan signal having a low level. The output pull-up module 208 and the output pull-down module 209 output a scan signal G(n) having a high level and a scan signal G(n) having a low level in response to the n-th stage transfer signal S(n) having the high level and the n-th stage transfer signal S(n) having the low level alternately output by the logic control module.

In the present embodiment, the input pull-up module 201 is used to control a potential of a first node Q, including the pulling up and the pulling down of the potential of the first node Q. The input pull-up module 201 is connected to the first node Q through the voltage clamping module 207. The input pull-up module 201 receives a first clock signal XCK. When the input pull-up module 201 is turned on under the control of the first clock signal XCK, a start signal STV or an (n−1)-th stage transfer signal S(n−1) output by an (n−1)-th stage gate driving unit GOA(n−1) is outputted to the first node Q through a turned-on voltage clamping module 207, to charge the first node Q, thereby controlling the potential of the first node Q. The transistor in the input pull-up module 201 is a P-type low temperature polysilicon thin film transistor. Further, a first stage gate driving unit GOA1 outputs the start signal STV to the first node Q; when n is greater than or equal to 2, the n-th stage gate driving unit GOA(n) outputs the (n−1)-th stage transfer signal to the first node Q.

Specifically, the input pull-up module 201 includes a first P-type low temperature polysilicon thin film transistor T1, a gate of the first P-type low temperature polysilicon thin film transistor T1 receives the first clock signal XCK, a first electrode of the first P-type low temperature polysilicon thin film transistor T1 receives the start signal STV or the (n−1)-th stage transfer signal S(n−1) output by the (n−1)-th stage gate driving unit GOA(n−1), and a second electrode of the first P-type low temperature polysilicon thin film transistor T1 is connected to the first node Q through the voltage clamping module 207.

In the present embodiment, the stage transfer output module 202 is configured to output an n-th stage transfer signal S(n), that is, output the stage transfer signal of the current stage to provide an input signal for the next stage. The stage transfer output module 202 is connected to the first node Q, and is configured to receive a second clock signal CK, and output the second clock signal CK as an n-th stage transfer signal S(n) in response to a voltage of the first node Q. The second clock signal CK is a high-level signal and a low-level signal that alternate with each other to alternately output the n-th stage transfer signal S(n) having the high level and the n-th stage transfer signal S(n) having the low level, and n is an integer greater than or equal to 1 and less than or equal to N. A transistor in the stage transfer output module 202 is a P-type low temperature polysilicon thin film transistor. Further, the pulse period of the second clock signal CK is the same as the pulse period of the first clock signal XCK, and the phase of the second clock signal CK is opposite to the phase of the first clock signal XCK.

Specifically, the stage transfer output module 202 includes a second P-type low temperature polysilicon thin film transistor T2, a gate of the second P-type low temperature polysilicon thin film transistor T2 is connected to the first node Q, a first electrode of the second P-type low temperature polysilicon thin film transistor T2 receives the second clock signal CK, and a second electrode of the second P-type low temperature polysilicon thin film transistor T2 is connected to an output terminal from which the stage transfer output module 202 outputs the n-th stage transfer signal S(n).

In the present embodiment, the stage transfer maintaining module 203 is configured to maintain the n-th stage transfer signal S(n) at a high level. The stage transfer maintaining module 203 is connected to a second node P, and the stage transfer maintaining module 203 is configured to receives an input signal GAS1, and output the input signal GAS1 to an output terminal of the stage transfer output module 202 in response to a voltage of the second node P to maintain the potential of the n-th stage transfer signal S(n). The transistor in the stage transfer maintaining module 203 is a P-type low temperature polysilicon thin film transistor. The input signal GAS1 is a high-level signal when the display panel 100 is in normal operation, so that the high-level signal is outputted to the output terminal for the n-th stage transfer signal S(n) when the stage transfer maintaining module 203 is turned on. The input signal GAS1 is a low-level signal when the display panel is abnormally powered down, so that the stage transfer maintaining module 203 outputs a low-level signal to the output terminal for the n-th stage transfer signal S(n), the n-th stage transfer signal S(n) is a low-level signal, the output pull-up module 208 outputs an n-th stage scan signal having the high-level in response to the n-th stage transfer signal with the low-level, the switching transistor K is turned on, and the display panel displays.

Specifically, the stage transfer maintaining module 203 includes a fourth P-type low temperature polysilicon thin film transistor T4, a gate of the fourth P-type low temperature polysilicon thin film transistor T4 is connected to the second node P, a first electrode of the fourth P-type low temperature polysilicon thin film transistor T4 receives the input signal GAS1, and a second electrode of the fourth P-type low temperature polysilicon thin film transistor T4 is connected to the output terminal of the stage transfer output module 202.

In the present embodiment, the first node maintaining module 204 is configured to maintain the potential of the first node Q. The first node maintaining module 204 is connected to the first node Q and the second node P, and the first node maintaining module 204 receives the second control signal and maintains the potential of the first node Q in response to the voltage of the second node P and the second control signal. A transistor in the first node maintaining module 204 is a P-type low temperature polysilicon thin film transistor. In addition, the second control signal is the second clock signal CK.

Specifically, the first node maintaining module 204 includes a fifth P-type low temperature polysilicon thin film transistor T5 and a sixth P-type low temperature polysilicon thin film transistor T6, a gate of the fifth P-type low temperature polysilicon thin film transistor T5 receives the second clock signal CK, a first electrode of the fifth P-type low temperature polysilicon thin film transistor T5 is connected to the first node Q through the voltage clamping module 207, a gate of the sixth P-type low temperature polysilicon thin film transistor T6 is connected to the second node P, a first electrode of the sixth P-type low temperature polysilicon thin film transistor T6 receives the input signal GAS1, and a second electrode of the sixth P-type low temperature polysilicon thin film transistor T6 is connected to a second electrode of the fifth P-type low temperature polysilicon thin film transistor T5. When the fifth P-type low temperature polysilicon thin film transistor T5 and the sixth P-type low temperature polysilicon thin film transistor T6 are simultaneously turned on, a high-level signal of the input signal GAS1 is outputted to the first node Q so that the potential of the first node Q is high.

In this embodiment, the first node feedback module 205 is connected to the first node Q and the second node P, and the first node feedback module 205 receives the first clock signal XCK and outputs the first clock signal XCK to the second node P in response to the voltage of the first node Q to adjust the potential of the second node P. A transistor in the first node feedback module 205 is a P-type low temperature polysilicon thin film transistor. If the potential of the first node Q is a high level, the first node feedback module 205 is turned off; if the potential of the first node Q is a low level, the first node feedback module 205 is turned on, and the first clock signal XCK is outputted to the second node P. If the first clock signal XCK is a high-level signal, the potential of the second node P is the high-level, and the fourth P-type low temperature polysilicon thin film transistor T4 is turned off; if the first clock signal XCK is a low-level signal, the potential of the second node P is a low-level, and the fourth P-type low temperature polysilicon thin film transistor T4 is turned on.

Specifically, the first node feedback module 205 includes a seventh P-type low temperature polysilicon thin film transistor T7, a gate of the seventh P-type low temperature polysilicon thin film transistor T7 is connected to the first node Q, a first electrode of the seventh P-type low temperature polysilicon thin film transistor T7 receives the first clock signal XCK, and a second electrode of the seventh P-type low temperature polysilicon thin film transistor T7 is connected to the second node P.

In the present embodiment, the second node pull-down module 206 is configured to pull down the potential of the second node P. The second node pull-down module 206 is connected to the second node P, receives a second constant low level voltage VGL2 and the first clock signal XCK, and outputs the second constant low level voltage VGL2 to the second node P in response to control of the first clock signal XCK, thereby pulling down the potential of the second node P. A transistor in the second node pull-down module 206 is a P-type low temperature polysilicon thin film transistor.

Specifically, the second node pull-down module 206 includes an eighth P-type low temperature polysilicon thin film transistor T8, a gate of the eighth P-type low temperature polysilicon thin film transistor T8 receives a first clock signal XCK, a first electrode of the eighth P-type low temperature polysilicon thin film transistor T8 receives the second constant low level voltage VGL2, and a second electrode of the eighth P-type low temperature polysilicon thin film transistor T8 is connected to the second node P.

In the present embodiment, the voltage clamping module 207 is used to maintain the potential of the first node Q. The voltage clamping module 207 is connected between the input pull-up module 201 and the first node Q, and the voltage clamping module 207 receives a third constant low level voltage VGL3 and is turned on in response to the third constant low level voltage VGL3. A transistor in the voltage clamping module 207 is a P-type low temperature polysilicon thin film transistor. Further, the third constant low level voltage VGL3 is the same as the second constant low level voltage VGL2.

Specifically, the voltage clamping module 207 includes a ninth P-type low temperature polysilicon thin film transistor T9, a gate of the ninth P-type low temperature polysilicon thin film transistor T9 receives the third constant low level voltage VGL3, a first electrode of the ninth P-type low temperature polysilicon thin film transistor T9 is connected to a first node Q, and a second electrode of the ninth P-type low temperature polysilicon thin film transistor T9 is connected to an output end of the input pull-up module 201.

In the present embodiment, the n-th stage gate driving unit further includes a first capacitor C1, a first electrode of the first capacitor C1 is connected to the first node Q, and a second electrode of the first capacitor C1 is connected to the output terminal of the stage transfer output module 202. The first capacitor C1 is for bootstrapping the potential of the first node Q by a coupling action.

In the present embodiment, the n-th stage gate driving unit further includes a second capacitor C2, a first electrode of the second capacitor C2 is connected to the second node P, and a second electrode of the second capacitor C2 receives the input signal GAS1.

In the present embodiment, an input terminal of the output pull-up module 208 is connected to the output terminal of the stage transfer output module 202, receives a constant high level voltage VGH, and outputs the constant voltage high-level signal in response to the n-th stage transfer signal S(n) with the low level to output the n-th stage scan signal G(n) with the high level. A transistor of the output pull-up module 208 is a P-type low temperature polysilicon thin film transistor, so that the output pull-up module 208 has a good pull-up capability, and the time of the rising edge, where the n-th stage scan signal with the low level is pulled up to the n-th stage scan signal with the high level, is shorter, which facilitates the gate driving circuit to output the scan signal at a high frequency.

Specifically, the output pull-up module 208 includes a third P-type low temperature polysilicon thin film transistor T3, a gate of the third P-type low temperature polysilicon thin film transistor T3 is connected to the output terminal of the stage transfer output module 202, a first electrode of the third P-type low temperature polysilicon thin film transistor T3 receives the constant high level voltage VGH, and a second electrode of the third P-type low temperature polysilicon thin film transistor T3 is connected to the output terminal of the n-th stage gate driving unit GOA (n) from which the n-th stage scan signal is outputted.

In the present embodiment, an input terminal of the output pull-down module 209 is connected to the output terminal of the stage transfer output module 202, and the output pull-down module 209 receives the first constant low level voltage VGL1, and outputs the first constant low level voltage VGL1 in response to the n-th stage transfer signal S(n) with the high level, thereby outputting the n-th stage scan signal G(n) with the low level. A transistor in the output pull-down module 209 is an N-type metal oxide thin film transistor, so that the output pull-down module 209 has a good pull-down capability, and the time of the falling edge, corresponding to a period during which the n-th stage scan signal with the high level is pulled down to the n-th stage scan signal with the low level, is shorter, which facilitates the gate driving circuit to output the scan signal at a high frequency. In addition, the first constant low level voltage VGL1 is larger than the second constant low level voltage VGL2.

Specifically, the output pull-down module 209 includes a first N-type metal oxide thin film transistor T10, a gate of the first N-type metal oxide thin film transistor T10 is connected to an output terminal of the stage transfer output module 202, a first electrode of the first N-type metal oxide thin film transistor T10 receives a first constant low level voltage VGL1, and a second electrode of the first N-type metal oxide thin film transistor T10 is connected to the output terminal of the n-th stage gate driving unit GOA(n) from which the n-th stage scan signal is outputted.

In the present embodiment, an output terminal of the touch control maintaining module 210 is connected to the output terminal of the n-th-stage gate driving unit GOA(n) for outputting the n-th-stage scan signal, the touch control maintaining module 210 receives the first constant low level voltage VGL1, the touch control maintaining module 210 receives a first control signal GAS2, and outputs the first constant low level voltage VGL1 to the output terminal of the n-th-stage gate driving unit GOA(n) in response to the first control signal GAS2, thereby outputting the scan signal G(n) with the low level. A transistor in the touch control maintaining module 210 is an N-type metal oxide thin film transistor, so that the touch control maintaining module 210 can quickly implement pull-down, which facilitates the gate driving circuit to output a scan signal at a high frequency. When the display panel 100 is in a touch phase, the first control signal GAS2 is a high-level signal, the touch control maintaining module 210 is turned on, the touch control maintaining module 210 outputs the first constant low level voltage VGL1 as a scan signal, the gate driving units of the display panel 100 all output the scan signal with the low level, the switching transistor K of the pixel circuit 30 is in the turned off state, and the pixel circuit is not operating. When the display panel 100 is in the display phase, the first control signal GAS2 is at a low level, and the touch control maintaining module 210 is turned off.

Specifically, the touch control maintaining module 210 includes a second N-type metal oxide thin film transistor T11, a gate of the second N-type metal oxide thin film transistor T11 receives the first control signal GAS2, a first electrode of the second N-type metal oxide thin film transistor GAS2 receives the first constant low level voltage VGL1, and a second electrode of the second N-type metal oxide thin film transistor T11 is connected to the output terminal of the n-th stage gate driving unit GOA(n).

The gate driving unit of the gate driving circuit of the present application is composed of P-type low temperature polysilicon thin film transistors and N-type metal oxide thin film transistors. Since both the P-type low temperature polysilicon thin film transistors and the N-type metal oxide thin film transistors can be prepared by a low temperature process, the gate driving circuit can be prepared by a low temperature process, which meets a low temperature process requirement of a flexible display panel. In addition, the transistor in the output pull-up module of the gate driving unit is a P-type low temperature polysilicon thin film transistor, so that the output pull-up module can quickly realize pull-up, that is, quickly pull up the low-level scan signal to the high-level scan signal, and the transistor in the output pull-down module of the gate driving unit is the N-type metal oxide thin film transistor, so that the output pull-down module can quickly realize pull-down, that is, quickly pull down the high-level scan signal to the low-level scan signal. The fast pull-up together with the fast pull-down enable the gate driving unit to quickly and alternately output the high-level scan signal and the low-level scan signal, thereby realizing high-frequency driving of the scan line, and facilitating high-frequency display of the display panel.

Figure 3:
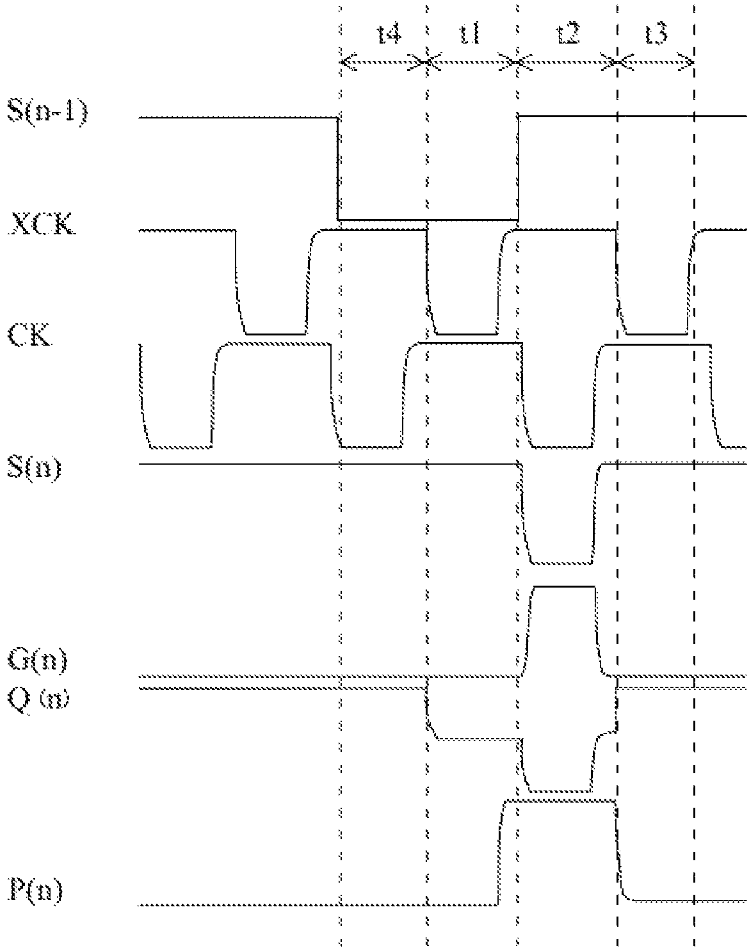
FIG. 3 is a driving timing diagram corresponding to the gate driving unit shown in FIG. 2.

As shown in FIG. 3, it is a driving timing diagram corresponding to the gate driving unit shown in FIG. 2. Here, S(n−1) is the (n−1)-th stage transfer signal, XCK is the first clock signal, CK is the second clock signal, S(n) is the n-th stage transfer signal, G(n) is the n-th stage scan signal, Q(n) is the potential of the first node, and P(n) is the potential of the second node. The driving process of the n-th stage gate driving unit GOA(n) includes the following steps:

During a charging stage t1, the (n−1)-th stage transfer signal S(n−1) is the low-level signal, the first clock signal XCK is a low-level signal, and the second clock signal CK is a high-level signal. The first P-type low temperature polysilicon thin film transistor T1 is turned on, the low-level signal of the (n−1)-th stage transfer signal S(n−1) is inputted to the first node Q to charge the first node Q, the potential of the first node Q becomes low, the second P-type low temperature polysilicon thin film transistor T2 is turned on, the high-level signal of the second clock signal CK is outputted as the n-th stage transfer signal S(n) with a high level, the first N-type metal oxide thin film transistor T10 is turned on, and the scan signal G(n) with the low level is outputted. Further, the eighth P-type low temperature polysilicon thin film transistor T8 is turned on, the second constant voltage low level VGL2 is written to the second node P, the seventh P-type low temperature polysilicon thin film transistor T7 is turned on, the low-level signal of the first clock signal XCK is written to the second node P, the potential of the second node P is the low level, the fourth P-type low temperature polysilicon thin film transistor T4 is turned on, and the high-level signal of the input signal GAS1 is outputted to the output terminal of the stage transfer output module 202.

During an output stage t2, the (n−1)-th stage transfer signal S(n−1) is a high-level signal, the first clock signal XCK is a high-level signal, and the second clock signal CK is a low-level signal. The first P-type low temperature polysilicon thin film transistor T1 is turned off, the ninth P-type low temperature polysilicon thin film transistor T9 is turned on, the first capacitor C1 maintains the potential of the first node Q at a low level, the low-level signal of the second clock signal CK is outputted as the n-th stage transfer signal S(n), and the n-th stage transfer signal S(n) is a low-level signal. The coupling action of the first capacitor C1 causes the potential of the first node Q to be further lowered, the second P-type low temperature polysilicon thin film transistor T2 is turned on to output the n-th stage transfer signal with the low-level signal, the third P-type low temperature polysilicon thin film transistor T3 is turned on, and the high-level scan signal G(n) is outputted. The eighth P-type low temperature polysilicon thin film transistor T8 is turned off, the seventh P-type low temperature polysilicon thin film transistor T7 is turned on, the high-level signal of the first clock signal XCK is outputted to the second node P, the potential of the second node P is the high level, the fourth P-type low temperature polysilicon thin film transistor T4 is turned off, and the sixth P-type low temperature polysilicon thin film transistor T6 is turned off.

During a pull-down stage t3, the (n−1)-th stage transfer signal S(n−1) is a high-level signal, the first clock signal XCK is a low-level signal, and the second clock signal CK is a high-level signal. The first P-type low temperature polysilicon thin film transistor T1 is turned on, and the high-level signal of the (n−1)-th stage transfer signal S(n−1) is outputted to the first node Q through the first P-type low temperature polysilicon thin film transistor T1 and the ninth P-type low temperature polysilicon thin film transistor T9 which are both turned-on. The potential of the first node Q is the high level, and the second P-type low temperature polysilicon thin film transistor T2 is turned off. The seventh P-type low temperature polysilicon thin film transistor T7 is turned off, the eighth P-type low temperature polysilicon thin film transistor T8 is turned on, the second constant low level voltage VGL2 is written to the second node P, the potential of the second node P is low, the fourth P-type low temperature polysilicon thin film transistor T4 is turned on, the sixth P-type low temperature polysilicon thin film transistor T6 is turned on, the fifth P-type low temperature polysilicon thin film transistor T5 is turned off, the high-level signal of the input signal GAS1 is outputted as the n-th stage transfer signal with the high level, and the first N-type metal oxide thin film transistor T10 is turned on and outputs a low-level scan signal G(n).

During a first node pull-up stage t4, the (n−1)-th stage transfer signal S(n−1) is the low-level signal, the first clock signal XCK is the high-level signal, and the second clock signal CK is the low-level signal. The first P-type low temperature polysilicon thin film transistor T1 is turned off, the first capacitor C1 maintains the potential of the first node Q at a high level, and the second P-type low temperature polysilicon thin film transistor T2 is turned off. The seventh P-type low temperature polysilicon thin film transistor T7 is turned off, the eighth P-type low temperature polysilicon thin film transistor T8 is turned off, the second capacitor C2 maintains the potential of the second node P at a low level, the sixth P-type low temperature polysilicon thin film transistor T6 is turned on, the fifth P-type low temperature polysilicon thin film transistor T5 is turned on, the high-level signal of the input signal GAS1 is outputted to the first node Q, and the potential of the first node Q is pulled up.

Note that the charging stage t1, the output stage t2, the pull-down stage t3, and the first node pull-up stage t4 are sequentially performed and constitute a driving period. Since the third P-type low temperature polysilicon thin film transistor T3 has a fast pull-up capability during the output stage t2, and the first N-type metal oxide thin film transistor T10 has a fast pull-down capability during the pull-down stage t3, it is ensured that the high-level scan signal and the low-level scan signal may be outputted alternately and quickly, the gate driving circuit may output the scan signal at a high frequency, which facilitates the high frequency display of the display panel, and cooperating with the pixel circuit of the display panel, a low frequency or an ultra-low frequency display may be realized, so that the display panel may realize high frequency and low frequency dynamic display.

In this embodiment, as shown in FIG. 1, the demultiplexing circuit 40 includes a plurality of data buses, a plurality of first type switches Demux1, and a plurality of second type switches Demux2. The plurality of data buses include a data bus I1, a data bus I2, a data bus I3, and a data bus I4. The plurality of first type switches Demux1 are connected to first type control signal lines, the plurality of second type switches Demux2 are connected to second type control signal lines, data signals transmitted by two adjacent data buses are of opposite polarities, each data bus is connected to one first type switch Demux1 and one second type switch Demux2, one of the first type switch Demux1 and the second type switch Demux2 connected to the same data bus is connected to the first type data line D(m), and another of the first type switch Demux1 and the second type switch Demux2 connected to the same data bus is connected to the second type data line D(m+1) adjacent to the first type data line D(m). Both the first type switch Demux1 and the second type switch Demux2 are P-type low temperature polysilicon thin film transistors, that is, the transistors in the demultiplexing circuit 40 are P-type low temperature polysilicon thin film transistors, so that the manufacturing process of the demultiplexing circuit 40 meets the low temperature process requirements of the flexible display panel, and at the same time the transistors in the demultiplexing circuit 40 are the same as the transistors in the gate drive circuit 20, thereby facilitating simplification of the process.

Figure 4:
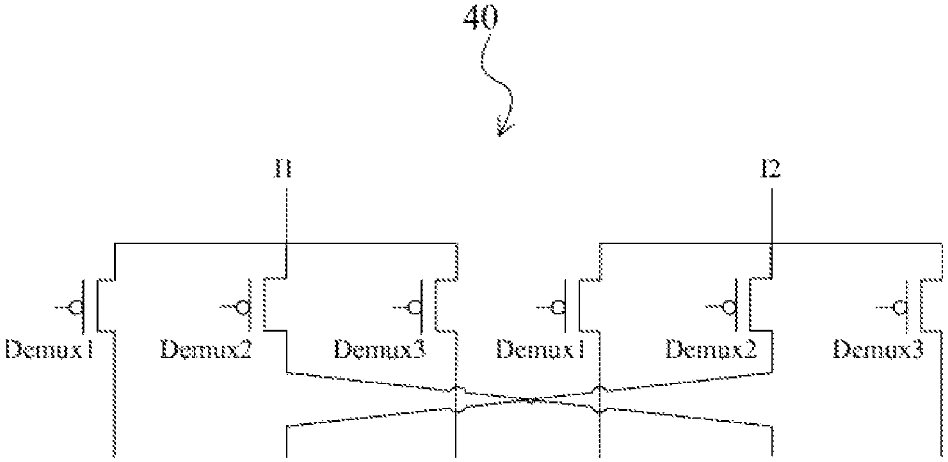
FIG. 4 is a schematic plan view of a demultiplexing circuit according to another embodiment of the present application.

As shown in FIG. 4, it is a schematic plan view of a demultiplexing circuit according to another embodiment of the present application. The demultiplexing circuit shown in FIG. 4 is substantially similar to the demultiplexing circuit shown in FIG. 1, except that the demultiplexing circuit 40 also includes third type switches Demux3, and the third type switches Demux3 are P-type low temperature polysilicon film transistors, each data bus is connected to one first type switch Demux1, one second type switch Demux2 and one third type switch Demux3. Both the first type switch Demux1 and the third type switch Demux3 are connected to one of the first type data line D(m) and the second type data line, and the second type switch Demux2 is connected to another of the first type data line D(m) and the second type data line D(m+1).

Figure 5:
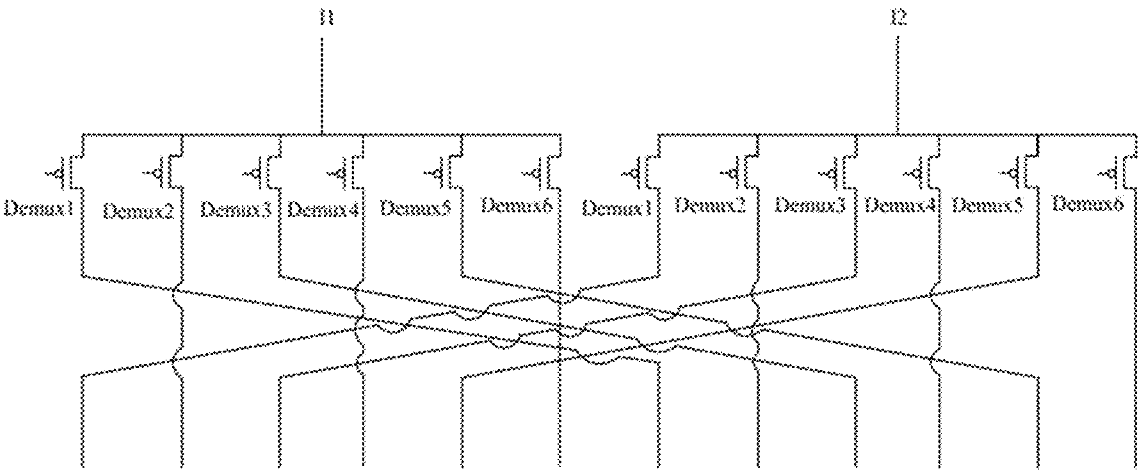
FIG. 5 is a schematic plan view of a demultiplexing circuit according to another embodiment of the present application.

As shown in FIG. 5, it is a schematic plan view of a demultiplexing circuit according to another embodiment of the present application. The demultiplexing circuit shown in FIG. 5 is substantially similar to the demultiplexing circuit shown in FIG. 4, except that the demultiplexing circuit further includes a fourth type switch Demux4, a fifth type switch Demux5, and a sixth type switch Demux6. The fourth type switch Demux4, the fifth type switch Demux5, and the sixth type switch Demux6 are all P-type low temperature polysilicon thin film transistors. Each data bus is connected to one first type switch Demux1, one second type switch Demux2, one third type switch Demux3, one fourth type switch Demux4, one fifth type switch Demux5, and one sixth type switch Demux6. The first type switch Demux1, the third type switch Demux3, and the fifth type switch Demux5 are all connected to one of the first type data line and the second type data line, and the second type switch Demux2, the fourth type switch Demux4 and the sixth type switch Demux6 are all connected to another of the first type data line and the second type data line.

Figure 6:
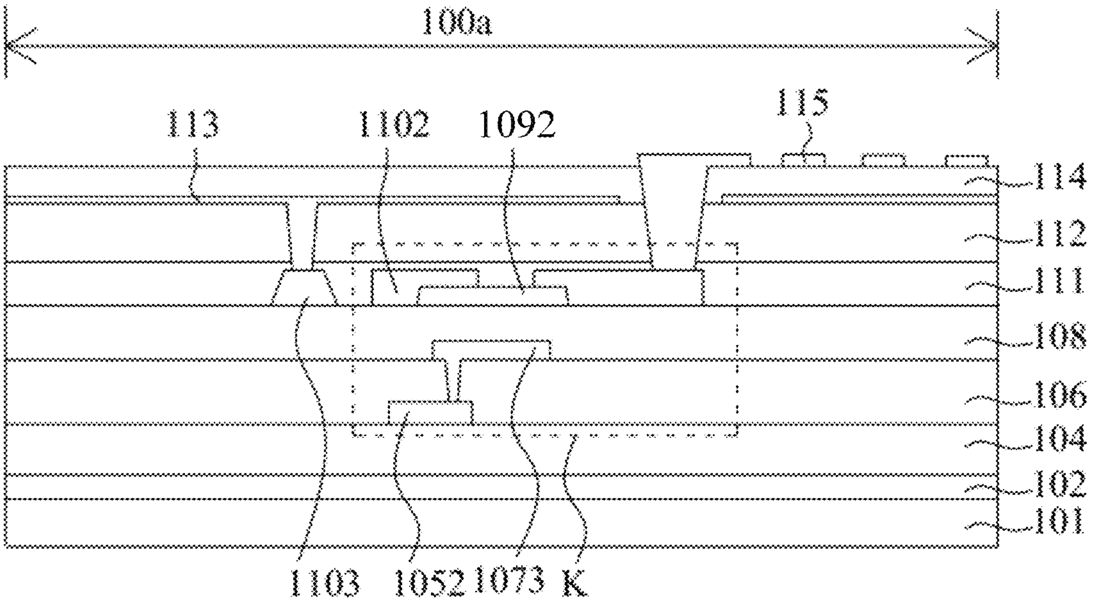
FIG. 6 is a schematic cross-sectional view of a display area of the display panel shown in FIG. 1.
Figure 7:
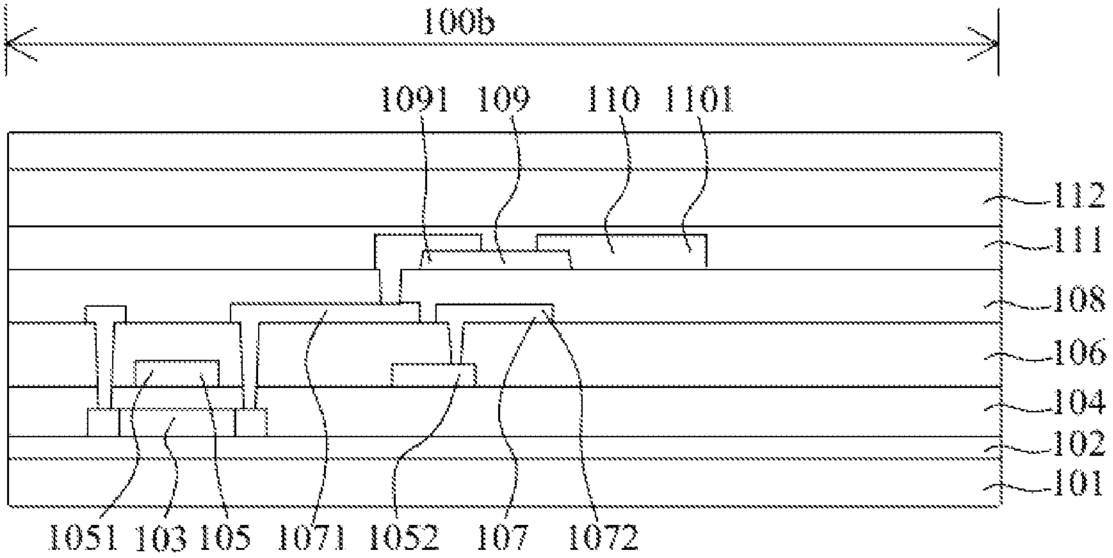
FIG. 7 is a schematic cross-sectional view of a peripheral region of the display panel shown in FIG. 1.

As shown in FIGS. 6 and 7, FIG. 6 is a schematic cross-sectional view of a display area of the display panel shown in FIG. 1, and FIG. 7 is a schematic cross-sectional view of a peripheral area of the display panel shown in FIG. 1. It can be seen from FIGS. 6 and 7, the display panel 100 includes a substrate 101, a buffer layer 102, a P-type low temperature polysilicon active layer 103, a first gate insulating layer 104, a first metal layer 105, an interlayer insulating layer 106, a second metal layer 107, a second gate insulating layer 108, an N-type metal oxide active layer 109, a third metal layer 110, a first passivation layer 111, a planarization layer 112, a common electrode layer 113, a second passivation layer 114, and a pixel electrode layer 115.

In this embodiment, the substrate 101 is a polyimide layer. Since the substrate 101 is the polyimide layer, the performance of the polyimide layer may be affected in the high temperature process, and therefore the film layer on the substrate 101 needs to be prepared in the low temperature process.

In the present embodiment, the buffer layer 102 is located in the display area 100*a* and the peripheral area 100*b* of the display panel 100, and the buffer layer 102 is disposed on the substrate 101. The buffer layer 102 is made of at least one of silicon nitride or silicon oxide.

In the present embodiment, the P-type low temperature polysilicon active layer 103 is disposed on the buffer layer 102, and the P-type low temperature polysilicon active layer 103 is located in the display region 100*a* and the peripheral region 100*b* of the display panel 100. The P-type low temperature polysilicon active layer 103 includes an active layer of the first P-type low temperature polysilicon thin film transistor T1, an active layer of the second P-type low temperature polysilicon thin film transistor T2, an active layer of the third P-type low temperature polysilicon thin film transistor T3, an active layer of the fourth P-type low temperature polysilicon thin film transistor T4, an active layer of the fifth P-type low temperature polysilicon thin film transistor T5, an active layer of the sixth P-type low temperature polysilicon thin film transistor T6, an active layer of the seventh P-type low temperature polysilicon thin film transistor T7, an active layer of the eighth P-type low temperature polysilicon thin film transistor T8 and an active layer of the ninth P-type low temperature polysilicon thin film transistor T9 in the above-described gate driving circuit 20, and an active layer of the transistor in the demultiplexing circuit 40. The P-type low temperature polysilicon active layer 103 does not need to be lightly doped so that a high-temperature process is avoided and the number of photomasks required is reduced.

In the present embodiment, the first gate insulating layer 104 is located in the display region 100*a* and the peripheral region 100*b* of the display panel 100, and the first gate insulating layer 104 covers the P-type low temperature polysilicon active layer 103 and the buffer layer 102. The first gate insulating layer 104 is made of at least one of silicon nitride or silicon oxide.

In the present embodiment, the first metal layer 105 is disposed on the first gate insulating layer 104, the first metal layer 105 includes gates of the first P-type low temperature polysilicon thin film transistor T1 to the ninth P-type low temperature polysilicon thin film transistor T9, and the gates 1051 of the first P-type low temperature polysilicon thin film transistor T1 to the ninth P-type low temperature polysilicon thin film transistor T9 are each disposed in the peripheral region 100*b*. The first metal layer 105 further includes a transmission line 1052 connected to the gate of the second N-type metal oxide thin film transistor T11, the gate of the first N-type metal oxide thin film transistor T10, and the gate of the switching transistor K. The transmission line 1052 is disposed in the display region 100*a* and the peripheral region 100*b*. The material of the first metal layer 105 is selected from at least one of molybdenum, aluminum, titanium, copper, silver, and nickel.

In the present embodiment, the interlayer insulating layer 106 is located in the display region 100*a* and the peripheral region 100*b* of the display panel 100, and the interlayer insulating layer 106 covers the first metal layer 105 and the first gate insulating layer 104. The interlayer insulating layer 106 is made of at least one of silicon nitride and silicon oxide.

In the present embodiment, the second metal layer 107 is disposed on the interlayer insulating layer 106, the second metal layer 107 includes a source/drain electrodes 1071 of the first P-type low temperature polysilicon thin film transistor T1 to the ninth P-type low temperature polysilicon thin film transistor T9, the source/drain electrodes 1071 of the first P-type low temperature polysilicon thin film transistor T1 to the ninth P-type low temperature polysilicon thin film transistor T9 are in contact with the corresponding low temperature polysilicon active layer through via holes passing through the interlayer insulating layer 106 and the first gate insulating layer 104, and the second metal layer 107 further includes gate electrodes 1072 of the second N-type metal oxide thin film transistor T11 and the first N-type metal oxide thin film transistor T10, and a gate 1073 of the switching transistor K, that is, the source/drain electrodes of the P-type low temperature polysilicon thin film transistor are disposed in the same layer as the gate of the N-type metal oxide thin film transistor. The gates 1072 of the second N-type metal oxide thin film transistor T11 and the first N-type metal oxide thin film transistor T10 are disposed in the peripheral region 100*b*, and the gate 1073 of the switching transistor K is disposed in the display region 100*a*. The material of the second metal layer 107 is selected from at least one of molybdenum, aluminum, titanium, copper, silver, and nickel.

In the present embodiment, the second gate insulating layer 108 is located in the display region 100*a* and the peripheral region 100*b*, and the second gate insulating layer 108 covers the second metal layer 107 and the interlayer insulating layer 106. The second gate insulating layer 108 is made of at least one of silicon nitride or silicon oxide.

In the present embodiment, the N-type metal oxide active layer 109 is disposed on the second gate insulating layer 108. The N-type metal oxide active layer 109 includes an active layer of the second N-type metal oxide thin film transistor T11, an active layer 1091 of the first N-type metal oxide thin film transistor T10, and an active layer 1092 of the switching transistor K. The material of the N-type metal oxide active layer 109 is indium gallium zinc oxide.

In the present embodiment, the third metal layer 110 is disposed on the N-type metal oxide active layer 109 and the second gate insulating layer 108, the third metal layer 110 includes source/drain electrodes 1101 of the second N-type metal oxide thin film transistor T11 and the first N-type metal oxide thin film transistor T10, and source/drain electrodes 1102 of the switching transistor K, and the third metal layer 110 further includes a touch lead 1103. The third metal layer 110 is selected from at least one of molybdenum, aluminum, titanium, copper, silver, and nickel. In the peripheral region 100*b*, the source of the N-type metal oxide thin film transistor is connected to the drain of the corresponding P-type low temperature polysilicon thin film transistor through a via hole penetrating the second gate insulating layer 108 electrically.

In the present embodiment, the first passivation layer 111 is located in the display region 100*a* and the peripheral region 100*b*, and the first passivation layer 111 covers the third metal layer 110 and the second gate insulating layer 108. The material of the first passivation layer 111 is selected from at least one of silicon nitride and silicon oxide.

In the present embodiment, the planarization layer 112 is located in the display region 100*a* and the peripheral region 100*b*, and the planarization layer 112 is disposed on the first passivation layer 111. The planarization layer 112 is an organic layer. The planarization layer 112 is made of polyimide, polyacrylate, or the like.

In the present embodiment, the common electrode layer 113 is disposed on the planarization layer 112. The common electrode layer 113 includes a plurality of common electrodes, the plurality of common electrodes are multiplexed as touch electrodes, and the plurality of common electrodes are time-division multiplexed. The plurality of common electrodes are electrically connected to the corresponding touch wires 1103 through via holes penetrating the planarization layer 112 and the first passivation layer 111. The material of the common electrode layer 113 is indium zinc oxide.

In the present embodiment, the second passivation layer 114 is located in the display region 100*a* and the peripheral region 100*b*, the second passivation layer 114 covers the common electrode layer 113 and the planarization layer 112, and the material of the second passivation layer 114 is selected from at least one of silicon nitride and silicon oxide.

In the present embodiment, the pixel electrode layer 115 is located in the display region 100*a*, the pixel electrode layer 115 is disposed on the second passivation layer 114, the pixel electrode layer 115 includes a plurality of pixel electrodes, and the pixel electrodes are connected to drains of the corresponding switching transistors K through via holes penetrating the second passivation layer 114, the planarization layer 112, and the first passivation layer 111. The material of the pixel electrode layer 115 is indium tin oxide.

In the display panel of the present embodiment, a top gate design is adopted for the P-type low temperature polysilicon thin film transistor, a bottom gate design is adopted for the N-type metal oxide thin film transistor, a source/drain electrode of the P-type low temperature polysilicon thin film transistor is disposed in the same layer as a gate of the N-type metal oxide thin film transistor, a touch wire for transmitting a touch signal is disposed in the same layer as a source/drain electrode of the N-type metal oxide thin film transistor, and a common electrode is multiplexed as a touch electrode. Since both the P-type low temperature polysilicon thin film transistor and the N-type metal oxide thin film transistor can be prepared by the low temperature process, the low temperature process requirement of the flexible display panel is satisfied, which is beneficial to realize the flexible display of the display panel.

The descriptions of the above embodiments are only used to help understand the technical solution and the core ideas of the present disclosure; those of ordinary skill in the art will appreciate that they may still modify the technical solutions described in the foregoing embodiments, or may replace some technical features thereof with equivalent replacements; these modifications or substitutions do not deviate the nature of the respective solutions from the scope of the solutions of the embodiments of the present application.

What is claimed is:

1. A display panel, wherein the display panel comprises N cascaded gate driving units, N is a positive integer, and an n-th stage gate driving unit comprising:

a stage transfer output module connected to a first node, and configured to alternately output an n-th stage transfer signal with a high level and an n-th stage transfer signal with a low level in response to a voltage of the first node, wherein n is an integer greater than or equal to 1 and less than or equal to N;

an input pull-up module configured to control a potential of the first node;

an output pull-up module connected to an output terminal of the stage transfer output module and configured to output an n-th stage scan signal with a high level in response to the n-th stage transfer signal with the low level; and an output pull-down module connected to the output terminal of the stage transfer output module and configured to output an n-th stage scan signal with a low level in response to the n-th stage transfer signal with the high level, wherein the transistors in the stage transfer output module, the input pull-up module, and the output pull-up module are all P-type low temperature polysilicon thin film transistors, and a transistor in the output pull-down module is an N-type metal oxide thin film transistor.

2. The display panel of claim 1, further comprising data lines and a demultiplexing circuit connected to the data lines, wherein transistors in the demultiplexing circuit are P-type low temperature polysilicon thin film transistors.

3. The display panel of claim 1, wherein the display panel further comprises a pixel circuit, the pixel circuit comprises a switching transistor, and the switching transistor is an N-type metal oxide thin film transistor.

4. The display panel of claim 1, wherein the n-th stage gate driving unit further comprises:

a touch control maintaining module, wherein an output terminal of the touch control maintaining module is connected to an output terminal of the n-th stage gate driving unit for outputting an n-th stage scan signal, the touch control maintaining module is configured to receive a first control signal and to output the n-th stage scan signal with the low level in response to the first control signal, and a transistor in the touch control maintaining module is an N-type metal oxide thin film transistor.

5. The display panel of claim 1, wherein the n-th stage gate driving unit further comprises:

a stage transfer maintaining module connected to a second node and configured to maintain a potential of the n-th stage transfer signal in response to a voltage of the second node, wherein a transistor in the stage transfer maintaining module is a P-type low temperature polysilicon thin film transistor.

6. The display panel of claim 5, wherein the n-th stage gate driving unit further comprises:

a first node maintaining module connected to the first node and the second node, and configured to receive a second control signal and maintain the potential of the first node in response to a voltage of the second node and the second control signal, wherein transistors in the first node maintaining module are P-type low temperature polysilicon thin film transistors.

7. The display panel of claim 5, wherein the n-th stage gate driving unit further comprises:

a first node feedback module connected to the first node and the second node, and configured to adjust a potential of the second node in response to a voltage of the first node, wherein a transistor in the first node feedback module is a P-type low temperature polysilicon thin film transistor.

8. The display panel of claim 5, wherein the n-th stage gate driving unit further comprises:

a second node pull-down module connected to the second node and configured to pull down a potential of the second node, wherein a transistor in the second node pull-down module is a P-type low temperature polysilicon thin film transistor.

9. The display panel of claim 5, wherein the n-th stage gate driving unit further comprises:

a first capacitor, wherein a first electrode of the first capacitor is connected to the first node and a second electrode of the first capacitor is connected to the output terminal of the stage transfer output module; and a second capacitor, wherein a first electrode of the second capacitor is connected to the second node, and a second electrode of the second capacitor receives an input signal.

10. The display panel of claim 1, wherein the n-th stage gate driving unit further comprises:

a voltage clamping module connected between the input pull-up module and the first node, wherein the voltage clamping module is configured to receive a constant low level voltage and to be in a turn-on state in response to the constant low level voltage, and a transistor in the voltage clamping module is a P-type low temperature polysilicon thin film transistor.

11. A display panel, wherein the display panel comprises N cascaded gate driving units, N is a positive integer, and an n-th stage gate driving unit comprising:

a first P-type low temperature polysilicon thin film transistor, wherein a gate of the first P-type low temperature polysilicon thin film transistor receives a first clock signal, a first electrode of the first P-type low temperature polysilicon thin film transistor receives a start signal or an (n−1)-th stage transfer signal output by an (n−1)-th stage gate driving unit, a second electrode of the first P-type low temperature polysilicon thin film transistor is connected to a first node, and n is an integer greater than or equal to 1 and less than or equal to N;

a second P-type low temperature polysilicon thin film transistor, wherein a gate of the second P-type low temperature polysilicon thin film transistor is connected to the first node, a first electrode of the second P-type low temperature polysilicon thin film transistor receives a second clock signal, and a second electrode of the second P-type low temperature polysilicon thin film transistor is connected to an output terminal of an n-th stage transfer signal;

a third P-type low temperature polysilicon thin film transistor, wherein a gate of the third P-type low temperature polysilicon thin film transistor is connected to the output terminal of the n-th stage transfer signal, a first electrode of the third P-type low temperature polysilicon thin film transistor receives a constant high level voltage, and a second electrode of the third P-type low temperature polysilicon thin film transistor is connected to an output terminal of the n-th stage gate driving unit; and a first N-type metal oxide thin film transistor, wherein a gate of the first N-type metal oxide thin film transistor is connected to the output terminal of the n-th stage transfer signal, a first electrode of the first N-type metal oxide thin film transistor receives a first constant low level voltage, and a second electrode of the first N-type metal oxide thin film transistor is connected to the output terminal of the n-th stage gate driving unit, wherein a pulse period of the second clock signal is the same as a pulse period of the first clock signal, and a phase of the second clock signal is opposite to a phase of the first clock signal.

12. The display panel of claim 11, wherein the display panel further comprises data lines and a demultiplexing circuit connected to the data lines, and transistors in the demultiplexing circuit are P-type low temperature polysilicon thin film transistors.

13. The display panel of claim 11, wherein the display panel further comprises a pixel circuit, the pixel circuit comprises a switching transistor, the switching transistor is an N-type metal oxide thin film transistor.

14. The display panel of claim 11, wherein the n-th stage gate driving unit further comprises:

a second N-type metal oxide thin film transistor, wherein a gate of the second N-type metal oxide thin film transistor receives a first control signal, a first electrode of the second N-type metal oxide thin film transistor receives a first constant low level voltage, and a second electrode of the second N-type metal oxide thin film transistor is connected to the output terminal of the n-th stage gate driving unit.

15. The display panel of claim 11, wherein the n-th stage gate driving unit further comprises:

a fourth P-type low temperature polysilicon thin film transistor, wherein a gate of the fourth P-type low temperature polysilicon thin film transistor is connected to a second node, a first electrode of the fourth P-type low temperature polysilicon thin film transistor receives an input signal, and a second electrode of the fourth P-type low temperature polysilicon thin film transistor is connected to the output terminal of the n-th stage transfer signal.

16. The display panel of claim 15, wherein the n-th stage gate driving unit further comprises:

a fifth P-type low temperature polysilicon thin film transistor, wherein a gate of the fifth P-type low temperature polysilicon thin film transistor receives the second clock signal, and a first electrode of the fifth P-type low temperature polysilicon thin film transistor is connected to the first node; and a sixth P-type low temperature polysilicon thin film transistor, wherein a gate of the sixth P-type low temperature polysilicon thin film transistor is connected to the second node, a first electrode of the sixth P-type low temperature polysilicon thin film transistor receives the input signal, and a second electrode of the sixth P-type low temperature polysilicon thin film transistor is connected to a second electrode of the fifth P-type low temperature polysilicon thin film transistor.

17. The display panel of claim 15, wherein the n-th stage gate driving unit further comprises:

a seventh P-type low temperature polysilicon thin film transistor, wherein a gate of the seventh P-type low temperature polysilicon thin film transistor is connected to the first node, a first electrode of the seventh P-type low temperature polysilicon thin film transistor receives the first clock signal, and a second electrode of the seventh P-type low temperature polysilicon thin film transistor is connected to the second node.

18. The display panel of claim 15, wherein the n-th stage gate driving unit further comprises:

an eighth P-type low temperature polysilicon thin film transistor, wherein a gate of the eighth P-type low temperature polysilicon thin film transistor receives the first clock signal, a first electrode of the eighth P-type low temperature polysilicon thin film transistor receives a second constant low level voltage, and a second electrode of the eighth P-type low temperature polysilicon thin film transistor is connected to the second node.

19. The display panel of claim 11, wherein the n-th stage gate driving unit further comprises:

a ninth P-type low temperature polysilicon thin film transistor, wherein a gate of the ninth P-type low temperature polysilicon thin film transistor receives a third constant low level voltage, a first electrode and a second electrode of the ninth P-type low temperature polysilicon thin film transistor are connected between the first node and the second electrode of the first P-type low temperature polysilicon thin film transistor.

20. The display panel of claim 15, wherein the n-th stage gate driving unit further comprises:

a first capacitor, wherein a first electrode of the first capacitor is connected to the first node and a second electrode of the first capacitor is connected to the output terminal of the n-th stage transfer signal; and a second capacitor, wherein a first electrode of the second capacitor is connected to the second node, and a second electrode of the second capacitor receives the input signal.

* * * * *